(12) United States Patent
Sato

(10) Patent No.: US 6,583,872 B2
(45) Date of Patent: Jun. 24, 2003

(54) DOUBLE BEAM SPECTROPHOTOMETER

(75) Inventor: Tatsumi Sato, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 262 days.

(21) Appl. No.: 09/752,732

(22) Filed: Jan. 3, 2001

(65) Prior Publication Data

US 2001/0013931 A1 Aug. 16, 2001

(30) Foreign Application Priority Data

Feb. 14, 2000 (JP) .................................. 2000-035724

(51) Int. Cl.[7] .............................. G01J 3/42; G01N 21/01
(52) U.S. Cl. ...................................... 356/325; 356/244
(58) Field of Search ................................ 356/319, 323, 356/324, 325, 244

(56) References Cited

U.S. PATENT DOCUMENTS 3,751,171 A * 8/1973 Hughes, Jr. et al. ........ 356/244
4,506,158 A * 3/1985 Cadwallader et al. ....... 356/244

* cited by examiner

*Primary Examiner*—F. L. Evans
(74) *Attorney, Agent, or Firm*—Kanesaka & Takeuchi

(57) ABSTRACT

In a double beam spectrophotometer, a sample beam is irradiated to a large-sized sample in a substantially vertical direction, and the beam upwardly transmitted through the large-sized sample is reflected by a reflecting mirror and sent to an integrating sphere including a detector. A reference beam irradiated parallel to the sample beam is deflected by reflecting mirrors such that the reference beam goes around the large-sized sample, and guided to the integrating sphere. Thus, a holder is not required to correspond to a size or shape of the sample, and measurement position can be freely changed by moving the sample. Also, in case of utilizing a conventional standard sample chamber, movable reflecting mirrors are inserted in the optical paths to transfer the beams to the standard sample chamber.

5 Claims, 2 Drawing Sheets

DOUBLE BEAM SPECTROPHOTOMETER

BACKGROUND OF THE INVENTION AND RELATED ART STATEMENT

The present invention relates to a double beam spectrophotometer which has two routes of optical paths for a sample side beam and a reference side beam.

FIG. 2 shows a schematic view showing an example of an optical path structure in a general double beam spectrophotometer which has been known conventionally. The spectrophotometer is provided for measuring an absorbance or transmittance of, for example, a liquid sample contained in a sample cell.

In FIG. 2, light irradiated from a light source 1 is introduced into a monochromator 2, wherein monochromatic light having a predetermined wavelength is taken out. The monochromatic light is sent to a sector mirror 4 by a reflecting mirror 3, and is alternately distributed by the sector mirror 4, which rotates on an axis A, into two directions, that is, a sample side and a reference side. In a standard sample chamber 11, there are provided a reference side cell 12 containing only a solvent or liquid, and a sample side cell 13 containing a sample solution. A reference side beam R reflected by the sector mirror 4 is irradiated to the reference side cell 12 through a reflecting mirror 5, and after the reference side beam R passes through the reference side cell 12, the beam is reflected and condensed by a condensing mirror 7 to be guided to a light receiving surface of a photodetector 10.

On the other hand, a sample side beam S which does not hit a reflecting mirror surface of the sector mirror 4 is irradiated to the sample side cell 13 through a reflecting mirror 6, and after the sample side beam S passes through the sample side cell 13, the beam is reflected and condensed by a condensing mirror 8, and further returned and reflected by a plane mirror 9 to be guided to the light receiving surface of the photodetector 10. Since the reference side transmitted beam R' which has passed through the reference side cell 12, and the sample side transmitted beam S' which has passed through the sample side cell 13, are guided alternately into the photodetector 10 in synchronism with a rotation of the sector mirror 4, the absorbance can be calculated by using a strength difference or strength ratio between the light receiving signals of both beams.

In the double beam spectrophotometer described above, since it is preferable to keep the symmetry between the sample side beam S and the reference side beam R as much as possible, optical paths of both beams S and R are normally set to be parallel to each other on the same horizontal plane. Also, in order to commonly use an accessary device, such as a sample chamber, with respect to various kinds of spectrophotometers sold by the same maker or manufacturer in a market, in the same maker, a clearance or separated distance d (normally around 100 mm to 200 mm) between the beams S and R is unified or standardized in many cases.

In the conventional optical path structure as described above, there is no problem in case the liquid sample accommodated in the sample cell with the predetermined size is measured. However, in case a solid sample, especially, a large-sized solid sample is measured, a clearance or separated distance d between the sample side beam S and the reference side beam R becomes a cause for limiting the size of the sample. Namely, a part of the large sample has to be cut into a measurable size. It is impossible to measure the large-sized sample which can not be cut as described above. In recent years, a size of a silicon wafer for a semiconductor or liquid crystal display plate, which is one of objects to be measured by the spectrophotometer of this type, has become larger rapidly, and the number of cases is increasing where the measurement can not be carried out in the standard sample chamber in which the separated distance d is set generally as described above.

Also, in the aforementioned conventional structure, since the beam passes through the sample in the horizontal direction, in order to set a sample with a thin shape, such as a silicon wafer or liquid crystal display plate, in the sample chamber, a holding mechanism for holding a sample vertically is necessary. This kind of the holding mechanism requires a cost, and setting thereof takes time and labor. Accordingly, in case the solid sample is measured, it is preferable to have a structure in which the sample can be placed horizontally.

The present invention has been made to solve the aforementioned problems, and an object of the invention is to provide a double beam spectrophotometer which can measure a solid sample with a large size in the condition that the sample is placed horizontally.

Further objects and advantages of the invention will be apparent from the following description of the invention.

SUMMARY OF THE INVENTION

To achieve the aforementioned object, the present invention provides a double beam spectrophotometer using a sample side beam and a reference side beam, wherein the sample side beam is provided or irradiated from a lower surface or upper surface of the sample, and the sample side beam passing through or ejected from the upper surface or the lower surface of the sample is reflected by a reflection optical system to be guided to a detector disposed outside projecting surfaces in a vertical direction of the sample. Also, in the double beam spectrophotometer, the reference side beam advancing parallel to the sample side beam is reflected by a reflection optical system having one or plural reflecting surfaces such that the reference side beam passes around the sample, and the reference side beam is guided to the detector.

Namely, in this structure, the sample side beam and the reference side beam advance in a direction to respectively hit the lower surface or the upper surface of the sample. The sample side beam advances straight as it is to pass through the sample. On the other hand, the reference side beam is deflected right before the sample by the reflection optical system in the direction to perpendicularly or obliquely cross the sample side beam, and reaches the detector without hitting the sample.

Also, in the double beam spectrophotometer according to the invention, reflecting mirrors, which can be freely retreated, may be inserted in optical paths for the sample side beam and the reference side beam so that both beams are deflected, and also, another reflection optical system may be inserted if necessary. Then, both beams may be guided into a sample chamber on a premise that the sample side beam and the reference side beam are disposed parallel to each other on the same horizontal plane with a predetermined distance therebetween.

DETAILED DESCRIPTION OF PREFERRED EMBODIMENTS

Figure 1:
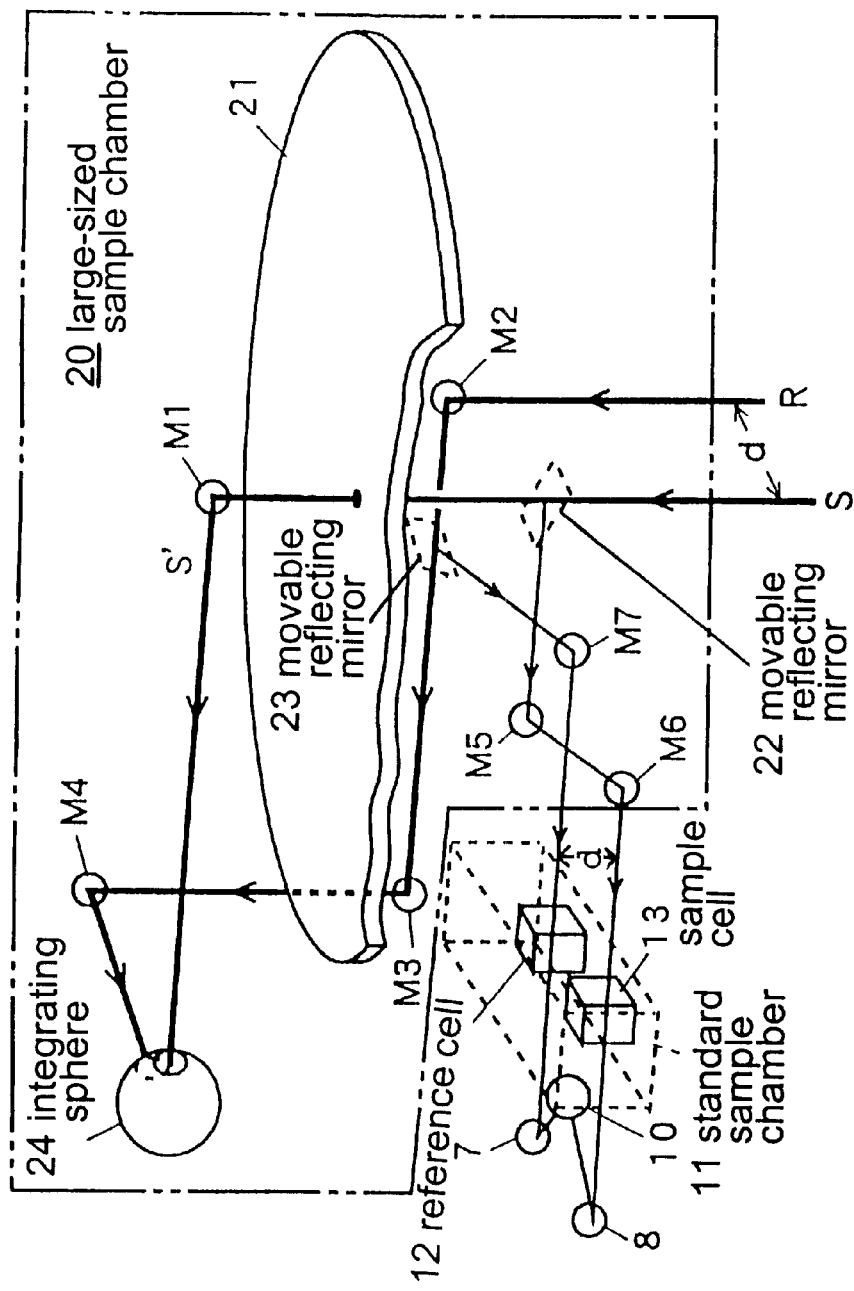
FIG. 1 is a schematic view of an optical path structure of a double beam spectrophotometer of an embodiment of the invention, wherein a sample is shown in a partly cut condition for the purpose of clearly showing optical paths.
Figure 2:
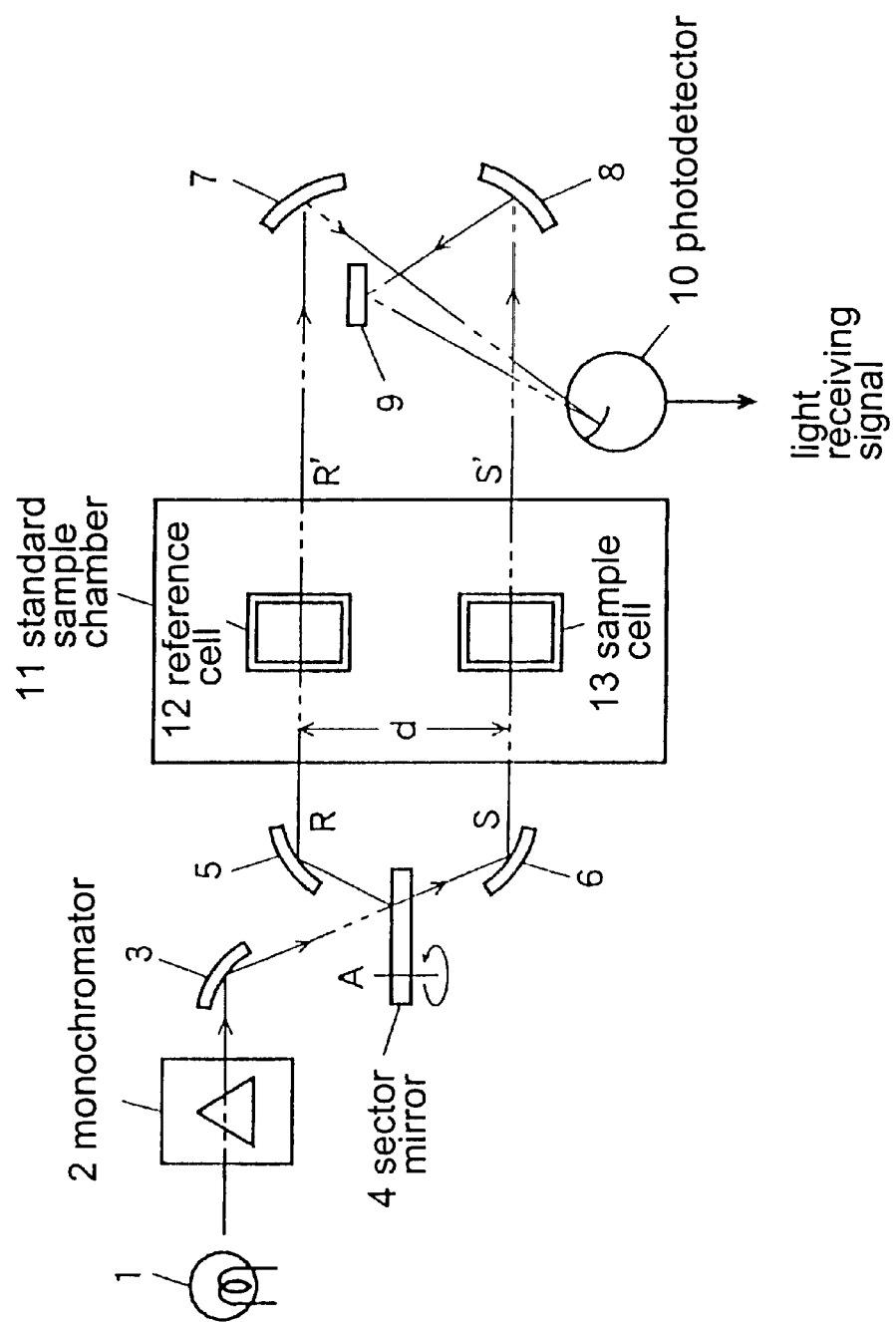
FIG. 2 is a schematic view of an optical path structure of a conventional double beam spectrophotometer.

Hereunder, an embodiment of a double beam spectrophotometer of the invention will be explained with reference to FIG. 1. FIG. 1 is a schematic perspective view showing an optical path structure of the double beam spectrophotometer according to the embodiment of the invention, and FIG. 1 shows only optical paths after the reflecting mirrors 5 and 6 in FIG. 2. Also, in FIG. 1, a sample 21 has a thin disc shape, which is shown in a partly cut condition in order to clearly show the optical paths.

In FIG. 1, the reference beam or reference side beam R and the sample beam or sample side beam S, which are arranged parallel to each other, are irradiated vertically into a large-sized sample chamber 20 from a lower side toward an upper side. Movable reflecting mirrors 22 and 23 are disposed to be freely movable between insertion positions in the optical paths and retreating positions from the optical paths, respectively. In case a large-sized sample 21 is measured, both reflecting mirrors 22 and 23 are placed at the retreating positions, and in case a sample located in the standard sample chamber 11 is measured, both the reflecting mirrors 22 and 23 are placed at the insertion positions.

In the large-sized sample chamber 20, the sample 21 is placed horizontally by a sample table or holder, not shown in the figure. More specifically, for example, the sample table has a hole at an irradiation portion through which the sample side beam S passes, and the sample 21 is placed on the sample table. The sample side beam S is irradiated in a substantially vertical direction to a lower surface of the sample 21, and the light which has passed upwardly through the sample 21 is reflected or deflected approximately perpendicularly by a reflecting mirror M1 to be irradiated into an integrating sphere 24 including a detector therein.

On the other hand, the reference side beam R is reflected to an approximately perpendicular direction by a reflecting mirror M2 disposed right before the sample 21. Then, the reference side beam R is further reflected approximately perpendicularly by a reflecting mirror M3, which is disposed at a position sufficiently away from the optical path of the sample side beam S irradiated into the large-sized sample chamber 20, and is also reflected approximately perpendicularly by a reflecting mirror M4, which is disposed at a vertical upper side of the reflecting mirror M3. Thus, the reference side beam is irradiated into the integrating sphere 24. Namely, the reference side beam R is deflected or reflected several times (three times in this example) such that the beam R goes around the sample 21, and then reaches the integrating sphere 24. Here, the reason why the integrating sphere is utilized as the detector is that even if the beam is slightly deflected to be deviated from the vertical line at the time of passing through the solid sample, the dispersed beam can be converged and sent to the detector. Therefore, it is not always necessary to use the integrating sphere in the invention.

According to the optical path structure as described above, the large-sized sample can be measured without having the limitation of the separated distance d between the beams in case of irradiating the beams into the large-sized sample chamber 20. Also, by simply moving the position of the sample 21 in the horizontal direction, the light transmitted through the desired position of the sample can be measured.

In case the sample (the reference side cell 12 and the sample side cell 13 in this example) set in the standard sample chamber 11 is measured, the movable reflecting mirrors 22 and 23 are inserted in the optical paths. Accordingly, the sample side beam S reflected by the movable reflecting mirror 22 is deflected by reflecting mirrors M5 and M6 to provide an optical path advancing in the horizontal direction toward the sample side cell 13. On the other hand, the reference side beam R reflected by the movable reflecting mirror 23 is deflected by a reflecting mirror M7 to provide an optical path which is located in the same horizontal plane with the sample side beam S and is parallel thereto such that the separated distance between the sample side beam S and the reference side beam R is d. Thus, various devices, which are formed on the premise that the separated distance between the beams is d and the irradiation is horizontal, such as the standard sample chamber 11 which has been used conventionally or various kinds of other accessory devices, can be used as they are.

Needless to say, the movable reflecting mirrors 22 and 23 may be freely detachable reflecting mirrors. Also, there can be adopted an optical path structure such that the incident light into the large-sized sample chamber 20 is irradiated from an upper side toward a vertical lower side to allow the sample side beam S to pass through the sample from the upper side toward the lower side. Also, there can be adopted an optical path structure such that the incident lights into the large-sized sample chamber 20 are irradiated from the horizontal direction and both beams are deflected upwardly by the reflecting mirrors.

Incidentally, the embodiment described above is one example, and it is clear that the embodiment can be changed and modified adequately within the gist of the present invention.

As explained above, according to the double beam spectrophotometer of the invention, the large-sized sample, which is difficult in measurement conventionally, can be measured in the condition that the sample is placed horizontally. In the horizontal placement, there is no need for preparing a holder with a size suitable for the sample. Especially, since the solid sample, which is provided as an object to be measured in this embodiment, has a various size and shape unlike the cell for measuring the solution sample, by simply placing the sample without using a special holder, the measurement can be carried out. Also, the measuring portion can be changed freely. Accordingly, the foregoings greatly contribute to lowering the cost and saving the labor in the measurement operation.

Also, according to the present invention, by providing a very simple structure such that the reflecting mirrors are simply inserted in the optical paths or retreated therefrom, it is possible to switch between a solution measurement using an ordinary sample cell or a measurement using the accessary devices, which are prepared as a standard, and a measurement for the large sized solid sample described above. Conventionally, in order to switch from the measurement utilizing the standard sample chamber to the measurement for the large-sized sample, it is required to have a cumbersome operation such that the standard sample chamber is detached and an optical system for introducing into the large-sized chamber is separately attached. According to the invention, however, this kind of the operation is no longer necessary, and the switch from the measurement utilizing the standard sample chamber to the measurement for the large-sized sample can be carried out by an extremely simple operation.

While the invention has been explained with reference to the specific embodiments of the invention, the explanation is illustrative and the invention is limited only by the appended claims.

What is claimed is:

1. A double beam spectrophotometer for a sample, comprising:

means for holding the sample in a lateral direction, means for providing a sample beam to one of a lower surface and an upper surface of the sample, a detector disposed laterally outside the means for holding the sample, a first reflection optical system for receiving the sample beam passing through the sample and guiding the sample beam to the detector, means for providing a reference beam parallel to the sample beam toward the sample holding means, a second reflection optical system for reflecting and guiding the reference beam to the detector without passing through the sample, a standard sample chamber having a reference cell and a sample cell, and means for selectively directing the sample beam and the reference beam supplied from the means for providing the sample beam and the reference beam to the standard sample chamber.

2. A double beam spectrophotometer according to claim 1, wherein said means for selectively directing the sample beam and the reference beam includes first and second reflecting mirrors movably located in paths from the means for providing the sample beam and the reference beam to the detector, respectively so that the sample beam and the reference beam are selectively supplied to another detector and the standard sample chamber.

3. A double beam spectrophotometer according to claim 2, further comprising a light source, and sector mirror for dividing light from the light source to provide the sample side beam and the reference side beam.

4. A double beam spectrophotometer according to claim 3, wherein said means for holding the sample is greater in size than the standard sample chamber.

5. A double beam spectrophotometer according to claim 4, wherein said means for holding the sample is a sample chamber disposed horizontally.

* * * * *